United States Patent [19]
Ormsby et al.

[11] Patent Number: 5,455,874
[45] Date of Patent: Oct. 3, 1995

[54] CONTINUOUS-TONE IMAGE COMPRESSION

[75] Inventors: Charles C. Ormsby, Andover; Stephen W. Boone, Beverly; Clyde D. Hardin, Jr., Reading; George S. Zabele, North Reading, all of Mass.

[73] Assignee: The Analytic Sciences Corporation, Reading, Mass.

[21] Appl. No.: 124,571

[22] Filed: Sep. 20, 1993

Related U.S. Application Data

[63] Continuation of Ser. No. 702,596, May 17, 1991, abandoned.

[51] Int. Cl.$^6$ .............................. G06K 9/00; H04N 7/12
[52] U.S. Cl. .................... 382/251; 348/395; 358/433; 364/725
[58] Field of Search .................... 382/56; 358/426, 358/433; 348/395, 403, 450; 364/725, 715.02

[56] References Cited

U.S. PATENT DOCUMENTS

| | | | |
|---|---|---|---|
| 3,804,975 | 4/1974 | Abe | 178/6 |
| 4,160,279 | 7/1979 | Fuwa | 358/288 |
| 4,286,256 | 8/1981 | Langdon, Jr. et al. | 340/347 |
| 4,366,506 | 12/1982 | Ejiri et al. | 358/260 |
| 4,467,317 | 8/1984 | Langdon, Jr. et al. | 340/347 |
| 4,494,108 | 1/1989 | Langdon, Jr. et al. | 340/347 |
| 4,558,350 | 12/1985 | Murakami | 358/21 R |
| 4,560,977 | 12/1985 | Murakami et al. | 340/347 AD |
| 4,567,464 | 1/1986 | Siegel et al. | 340/347 |
| 4,584,597 | 4/1986 | Guichard | 358/13 |
| 4,652,856 | 3/1987 | Mohiuddin et al. | 340/347 |
| 4,668,995 | 5/1987 | Chen et al. | 358/282 |
| 4,670,851 | 6/1987 | Murakami et al. | 364/518 |
| 4,725,885 | 2/1988 | Gonzales et al. | 358/135 |
| 4,749,983 | 6/1988 | Langdon, Jr. | 340/347 |
| 4,769,826 | 9/1988 | Kubo et al. | 375/122 |
| 4,772,946 | 9/1988 | Hammer | 358/133 |

(List continued on next page.)

FOREIGN PATENT DOCUMENTS

| | | | |
|---|---|---|---|
| 2030024 | 6/1978 | United Kingdom | H04N 1/41 |
| 2222739 | 3/1990 | United Kingdom | H04N 1/417 |

OTHER PUBLICATIONS

Hardin et al., "PPDB Image Compression—Final Report", TASC, 15 Aug. 1989.
Witten et al., "Arithmetic Coding for Data Compression", *Communications of The ACM*, vol. 30, No. 6, Jun., 1987, pp. 520–540.
Rissanen et al., "Arithmetic Coding", IBM J. Res. Develol., vol. 23, No. 2 Mar., 1979, pp. 149–161.
Pennebaker et al., "An Overview of the Basic Principles of the Q–Coder Adaptive Binary Arithmetic Coder", IBM. J. Res. Develop., vol. 32, No. 6, Nov. 1988, pp. 717–726.
Rissanen, "A Universal Data Compression System", IEEE Trans. on Information Theory, vol. IT–29, No. 5, Sep., 1983, pp. 656–664.
Malvar et al., "The LOT: Transform Coding Without Blocking Effects" *IEEE Trans. on Acoustics, Speech and Signal Processing*, vol. 37, No. 4, Apr., 1989, pp. 553–559.
Hardin et al., "PPDB Image Compression—Interim Report", The Analytic Sciences Corporation, Report TR–5569–1, May 17, 1989.
Hardin et al., "A New Software–Only Image Compression Technique", TASC—The Analytic Sciences Corporation, (List continued on next page.)

*Primary Examiner*—Leo H. Boudreau
*Attorney, Agent, or Firm*—Fish & Richardson

[57] ABSTRACT

Continuous tone images, represented by original data files are compressed by (1) transforming by a lapped orthogonal transform the original file of data to generate a transform file of coefficients, (2) quantizing the transform coefficients, and (3) coding the quantized values to generate a compressed data file, the lapped orthogonal transform being arranged to compute all transform coefficients by means only of bit shifts, negations, and adds. In another aspect, the quantization and coding are performed on groups of transformed coefficients.

24 Claims, 7 Drawing Sheets

U.S. PATENT DOCUMENTS

| | | | |
|---|---|---|---|
| 4,780,718 | 10/1988 | Hudson et al. | 342/25 |
| 4,785,356 | 11/1988 | Gonzales et al. | 358/260 |
| 4,792,954 | 12/1988 | Arps et al. | 371/48 |
| 4,797,739 | 1/1989 | Tanaka | 358/133 |
| 4,807,298 | 2/1989 | Conte et al. | 382/56 |
| 4,809,348 | 2/1989 | Meyer et al. | 382/49 |
| 4,811,398 | 3/1989 | Copperi et al. | 381/37 |
| 4,839,724 | 6/1989 | Keesen et al. | 382/56 |
| 4,845,559 | 7/1989 | Labit | 358/133 |
| 4,849,810 | 7/1989 | Ericsson | 358/133 |
| 4,851,906 | 7/1989 | Koga et al. | 358/133 |
| 4,853,778 | 8/1989 | Tanaka | 358/133 |
| 4,862,261 | 8/1989 | Tanaka | 358/133 |
| 4,862,262 | 8/1989 | Tanaka | 358/133 |
| 4,870,497 | 9/1989 | Chamzas et al. | 358/426 |
| 4,870,695 | 9/1989 | Gonzales et al. | 382/56 |
| 4,873,577 | 10/1989 | Chamzas | 358/426 |
| 4,891,643 | 1/1990 | Mitchell et al. | 341/107 |
| 4,905,297 | 2/1990 | Langdon, Jr. et al. | 382/56 |
| 4,910,608 | 3/1990 | Whiteman et al. | 358/463 |
| 4,922,273 | 5/1990 | Yonekawa et al. | 382/56 |
| 4,939,583 | 7/1990 | Tsuboi et al. | 358/426 |
| 5,048,111 | 9/1991 | Jones et al. | 382/56 |
| 5,051,840 | 9/1991 | Watanabe et al. | 358/433 |
| 5,063,608 | 11/1991 | Siegel | 382/56 |
| 5,086,489 | 2/1992 | Shimura | 382/56 |
| 5,136,663 | 8/1992 | Nishio | 382/56 |
| 5,177,797 | 1/1993 | Takenaka et al. | 382/56 |
| 5,218,647 | 6/1993 | Blonstein et al. | 382/56 |

OTHER PUBLICATIONS

Oct. 1, 1990 pp. 1–5.

Linde et al., "An Algorithm for Vector Quantizer Design", IEEE Trans. on Communications, vol. Com–28, No. 1, Jan. 1980, pp. 84–95.

Equitz, "A New Vector Quantization Clustering Algorithm", *IEEE Trans. on Acoustics, Speech and Signal Processing*, vol. 37, No. 10, Oct., 1989, pp. 1568–1575.

CONTINUOUS-TONE IMAGE COMPRESSION

This is a continuation of application Ser. No. 07/702,596, filed May 17, 1991, now abandoned.

BACKGROUND OF THE INVENTION

This invention relates to storing, retrieving, transmitting, and receiving continuous-tone images.

In an image of the continuous-tone type, each point in the image can take on any value within a range of values, with value changes between nearby points typically being gradual rather than abrupt. In a gray-scale continuous tone image, each point takes on a gray tone in a range from white to black. In color images, each point may be construed as a composite of continuous-tone values each lying in a corresponding range associated with color features such as luminance and chrominance, or primary color values.

For purposes of digital storage and transmission, a continuous tone image may be divided into a matrix of a large, but finite number p of discrete "pixels". The value of each pixel may then be sampled and digitized as an n-bit number representing its position in the range of possible continuous tone values. The amount of information which must be processed and stored when the product of n and p is large makes it useful, and in some cases mandatory, to apply data compression and reconstruction schemes to the pixel values to reduce the amount of storage or transmission capacity required.

A wide variety of data compression schemes have been proposed and implemented.

Summary of the Invention

In general, in one aspect, the invention features generating a compressed data file from an original data file used to represent a continuous-tone image, by (1) transforming by a lapped orthogonal transform the original file of data to generate a transform file of coefficients, (2) quantizing the transform coefficients, and (3) coding the quantized values to generate the compressed data file, the lapped orthogonal transform being arranged to compute all transform coefficients by means only of bit shifts, negations, and adds.

Embodiments of the invention include the following features. The lapped orthogonal transform uses only multiplier values which are powers of 2, e.g., ±1, ±2, ±4, and ±8. The lapped orthogonal transform is based on successive transformations of blocks of data, and the transformations of some blocks reuse results of transformations of other blocks. The coefficients are factored into at least two groups, and the quantizing and coding are applied independently to the respective groups (this, in itself, is a broad aspect of the invention). The coding comprises entropy coding, e.g., arithmetic coding conditioned on contexts.

In general, in another aspect, the invention features processing a continuous-tone image for later reconstruction, by acquiring from the image an original data file of digital data values representing continuous-tone information in the image, then transforming, quantizing, and coding as described above. In other aspects, the invention features reconstructing the original data file from a compressed data file by an inverse procedure.

In general, in other aspects, the invention features apparatus corresponding the methods described above, including a camera or scanner to acquire data from the image and a printer or display to reproduce the image.

In general, in another aspect, the invention features a method of converting a pixel data file representing a color image expressed in RGB color space to a pixel data file representing said color image in YUV color space for subsequent processing in YUV format. Each component (R, G, and B) of said RGB color space is represented as a non-negative 8-bit integer; and the R, G, and B components are converted to Y, U, and V components using only bit shifts and additions and no more than a single division operation.

Preferred embodiments of the invention include the following features. The converting is done in accordance with the following relationships:

$$Y=(R+4G+B+3)/6$$

$$U=(R-2G+B+2)/4+128$$

$$V=(R-B+1)/2+128.$$

The YUV pixel data file is reconverted to an RGB pixel data file by performing only multiplications, additions, shifts and no more than a single division, in accordance with the following relationships $$U'=[4(U-128)+1]/3$$

$$V'=V-128$$

$$R=Y+U'+V'$$

$$G=Y-U'/2$$

$$B=Y+U'-V'.$$

In general, another aspect, the invention features a method for generating a set of centroids to serve as a codebook for use in vector quantization of data representing a continuous-tone image. PNN and LBG procedures are applied to the vectors to create centroids. The number of vectors which quantize to each centroid are counted. The centroids are updated by reapplying the PNN and LBG procedures to input data which includes the previously generated centroids each applied with a weight based on the number of vectors which quantized to that centroid.

Both gray scale and color continuous-tone images may be compressed and reconstructed rapidly in software, with deep compression, and with high-quality reconstruction. The overlapping transform reduces the block artifacts common with standard block transforms. The system is capable of compressing and reconstructing a 256×256 gray scale image on a 80386-based personal computer with 640 Kbytes RAM in approximately 2.5 seconds. Reconstruction is accomplished in only 1.5 seconds due to the asymmetric nature of vector quantization.

Other advantages and features will become apparent from the following description and from the claims.

DESCRIPTION

We first briefly describe the drawings.

Figure 1:
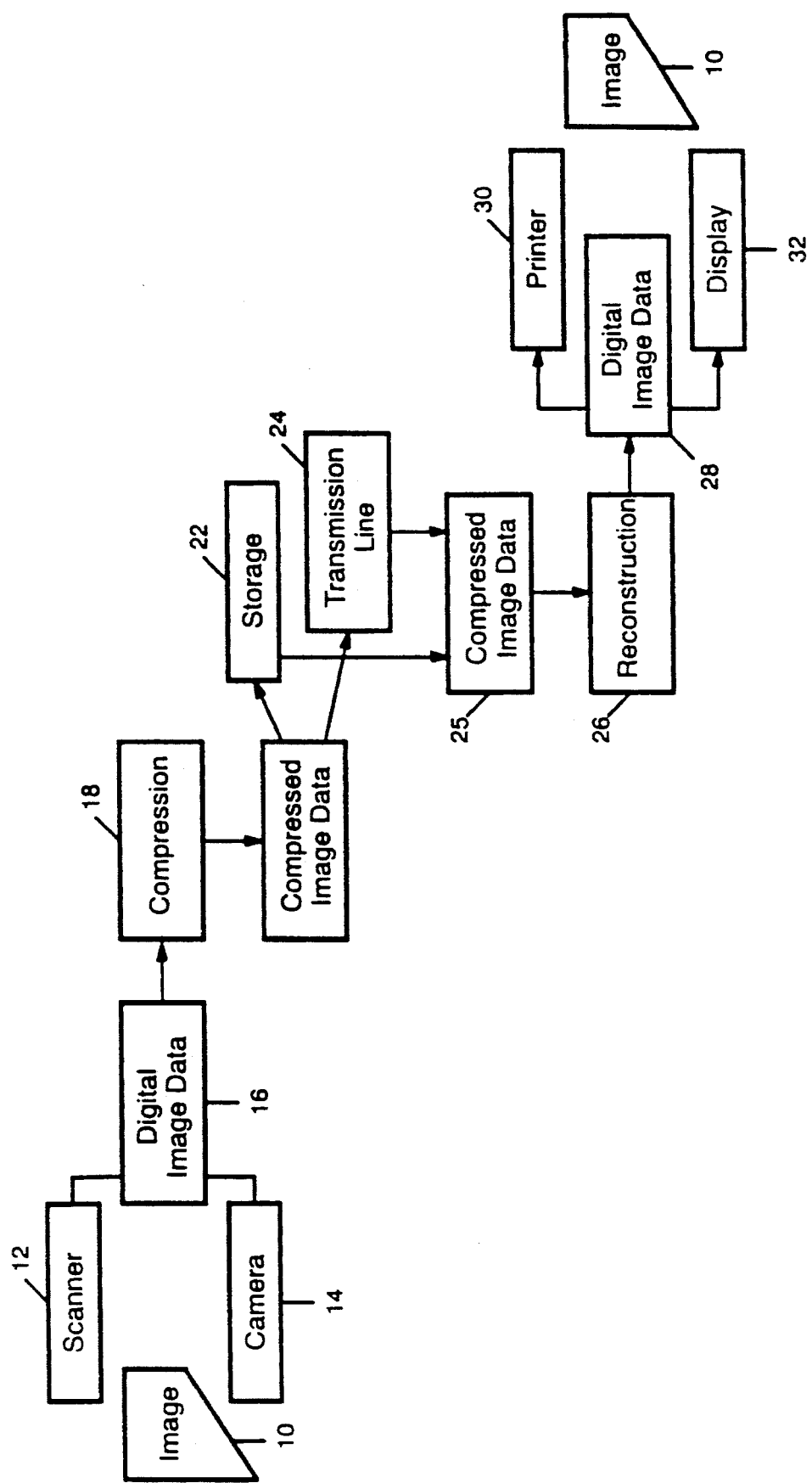
FIG. 1 is a block diagram of an image capture and reproduction system.

Referring to FIG. 1, a continuous tone image 10 may be "captured" by either a continuous tone scanner 12 or a camera 14 to derive digital image data (pixel values) 16. The data are subjected to compression 18 to produce compressed image data 20. The compressed data are delivered to storage (e.g., a disk store) 22 or to a transmission line 24. The compressed data 25 thereafter received from the storage 22 or the transmission line 24 are subjected to reconstruction 26 to recover the digital image data 28. The recovered data may then be passed to a printer 30 to produce paper or photographic copies or to a display 32, thus producing a representation of the original image.

Figure 2:
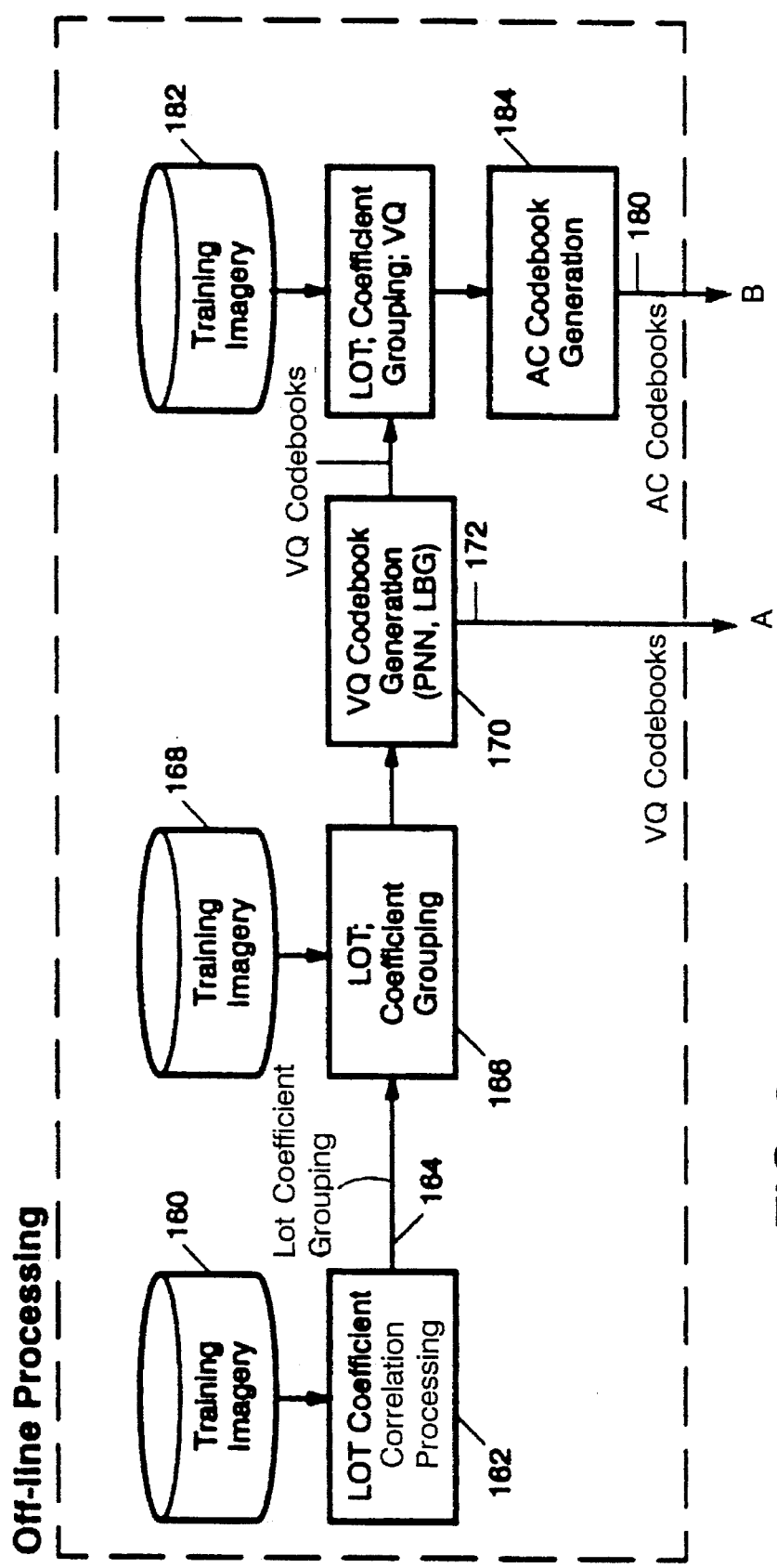
FIG. 2 is a block diagram of image compression and reconstruction.
Figure 2A:
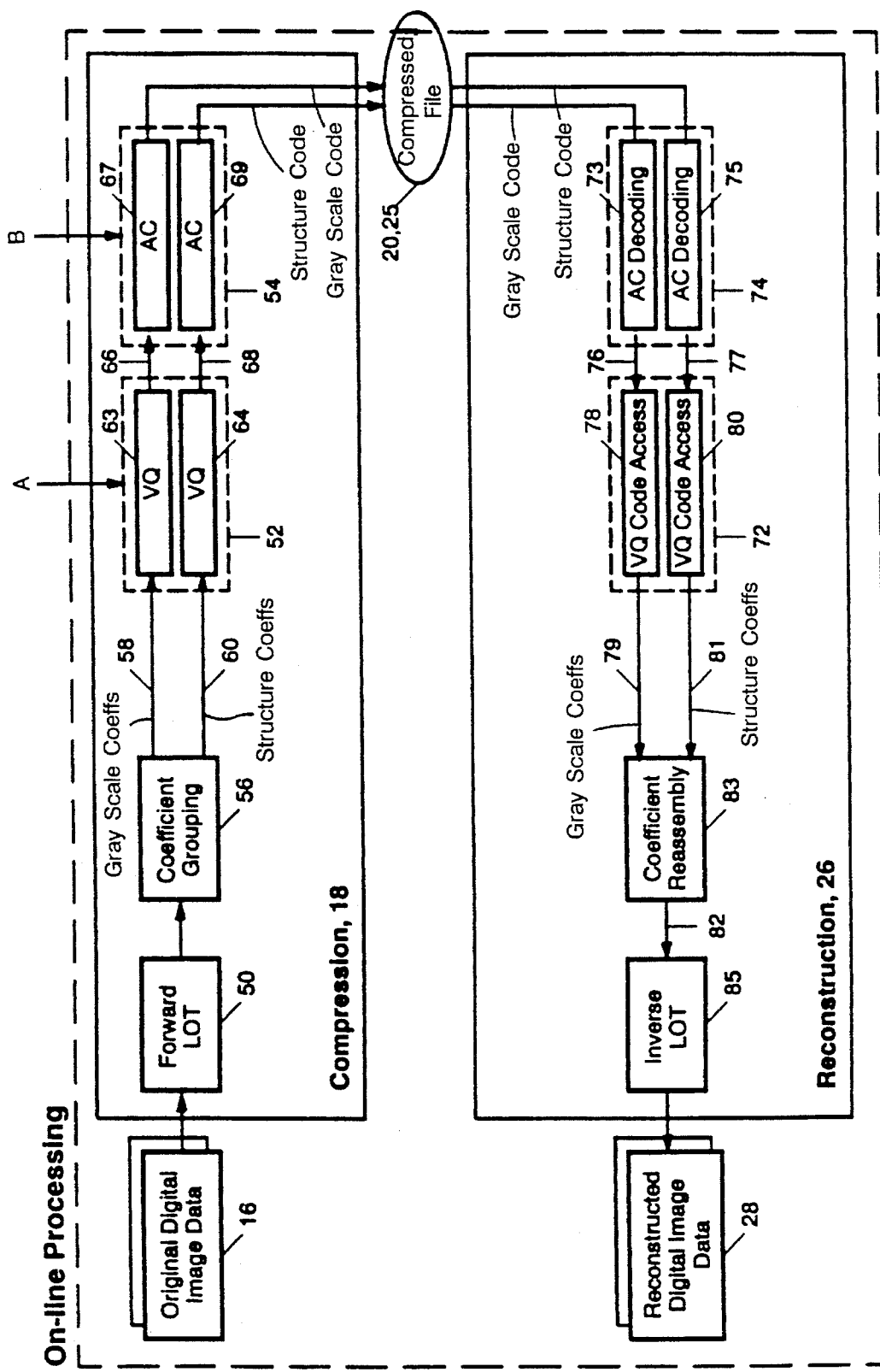

Referring to FIG. 2, the compression 18 and reconstruction 26 each comprise three major steps: a block-based lapped orthogonal transform (LOT) 50, 70; a factored vector quantization (VQ) 52, 72 using pre-computed codebooks; and an arithmetic coding (AC) 54, 74 of the VQ indices.

In general, the forward LOT 50 performs an integer-coefficient LOT which maps overlapping pixel blocks of dimension 8×8 to transform coefficient blocks of dimension 4×4. Each coefficient block is then factored (coefficient grouping 56) into two vectors (sets of coefficients), one of dimension 4, called a gray scale vector 58, and one of dimension 12, called a structure vector 60. The vectors are separately quantized (by vector quantizers 63, 64) according to pre-computed codebooks 62, and their quantization indices 66, 68 stored. Both the gray scale and structure quantization indices are coded with (separate) context-sensitive arithmetic coders 67, 69 to the structure code and the gray-scale code which comprise the output code (compressed) file 20.

Reconstruction entails the reverse operations. Arithmetic decoders 73, 75 determine the gray scale and structure VQ indices 76, 77, which allow full 4×4 LOT coefficient blocks 82 to be reassembled 83 from the corresponding vectors 79, 81. The inverse LOT 85 applied to these coefficient blocks produces the reconstructed image 28.

Figure 3:
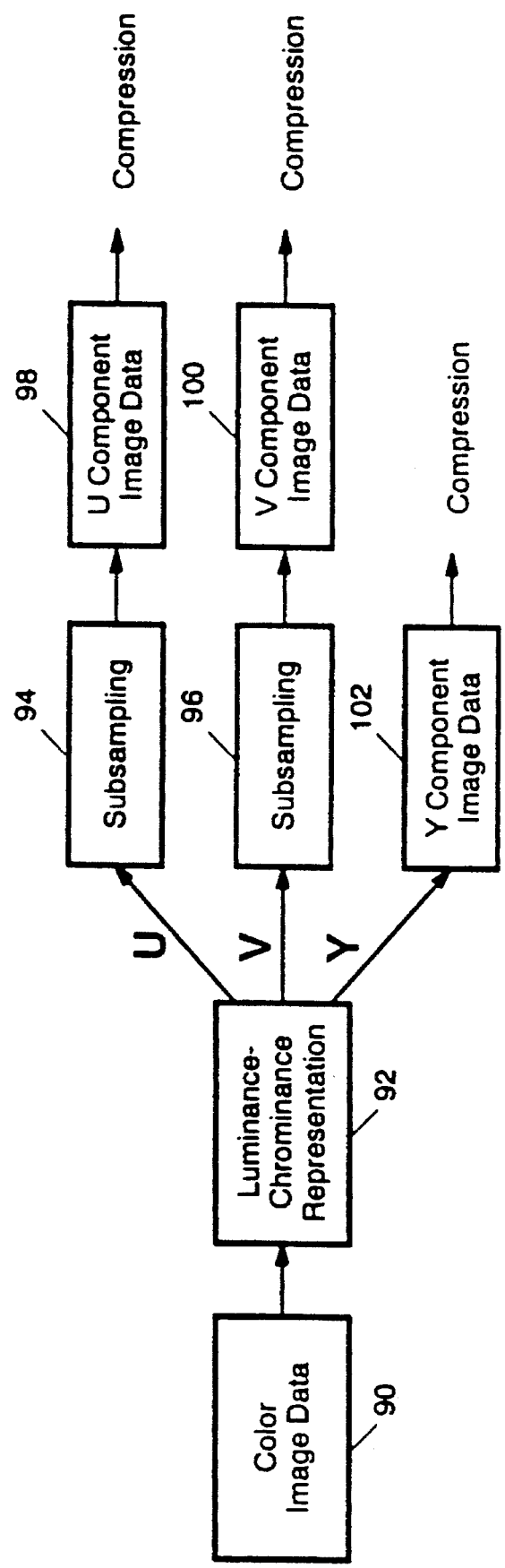
FIG. 3 is a block diagram of the treatment of color images.

The foregoing applies to compression and reconstruction of gray scale images. Referring to FIG. 3, to compress and reconstruct color images, the image 90 is transformed into a luminance-chrominance color space (YUV space) representation 92, if it is not already so represented. The chrominance components (U and V) are subsampled 94, 96 by eliminating every other pixel component in each direction, resulting in a 4-to-1 subsampling. The resulting Y, U, and V components are each treated as three separate images 98, 100, 102, and are compressed in the same manner as described above. Reconstruction is accomplished by separately reconstructing the components, expanding the U and V components to full resolution by pixel replication or interpolation, reassembling the components, and transforming the components back to the desired color space representation. In the case that the original color space is RGB (red, green, blue), a non-standard definition of YUV and fast transforms from RGB to YUV and back, are used for improved speed.

The compression and reconstruction schemes operate quickly and achieve high compression ratios with high-quality reconstructions. These results are achieved in part because of three elements of the design: the shift-valued LOT, the factored codebook for VQ and the contexts for arithmetic coding. We turn to each of these elements in turn.

The multipliers which define the LOT have values ±1, ±2, ±4, and ±8, which means that all transform coefficients are computed with bit shifts and adds. Further, the implementation of the LOT reuses quantities already computed to reduce the total number of computations required.

The VQ factored codebook scheme assures that those LOT coefficients with the highest cross-correlations are quantized together. This results in coding efficiency approaching full (non-factored) vector quantization, but also reduces storage requirements and allows much faster VQ searches. Instead of searching through one very large list of quantized blocks, say of size MN, the VQ step performs two independent searches through smaller blocks of size M and N, respectively.

The arithmetic coders code the gray scale and structure VQ indices using separate definitions of context, that is, separate sets of conditional probability distributions are used for each index set. For the gray scale indices, the conditional distribution used to code an index is determined by a fixed third-order autoregressive computation involving the gray scale indices of neighboring blocks. For the structure indices, a first-order Markov context, which determines context based on one neighboring block structure index, is used.

The Lapped Orthogonal Transform (LOT)

The lapped orthogonal transform (LOT) is a block-based transform, which is orthogonal over the entire image, but which is a many-to-one map on individual blocks of pixels. The LOT is described more fully in Malvar and Staelin, The LOT: Transform Coding Without Blocking Effects, IEEE Transactions on Acoustics, Speech, and Signal Processing vol. 37 no. 4, April 1989, pp. 553–559, incorporated herein by reference.

Figure 4:
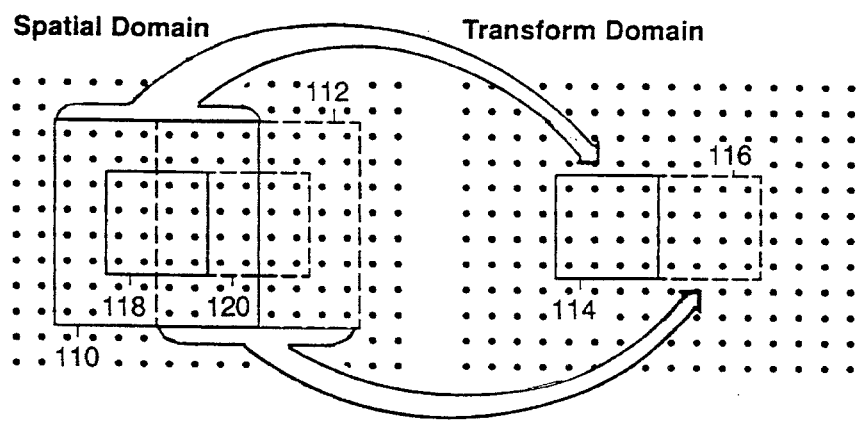
FIG. 4 is a diagram of LOT transform geometry.

Referring to FIG. 4, LOT maps overlapping blocks 110, 112 of N×N (e.g.,8×8) pixels to blocks 114, 116 of M×M (e.g.,4×4) transform coefficients, where M<N. The general requirements, given in the Malvar and Staelin reference, that a lapped block transform must satisfy in order to be orthogonal over the entire image are rather restrictive. Also given in that reference is a method for constructing LOTs based on the discrete cosine transform (DCT), and which satisfy an optimality condition within the class of DCT-based LOTs. All of the DCT-based LOTs, however, have non-integral coefficients, and require floating-point computations. The present invention incorporates a new LOT with integer coefficients (of the form $2^n$) permitting use of shift operations in place of integer multiplies, and a method for computing this LOT which reuses previously computed quantities, thus allowing the transform to be computed extremely rapidly.

The Forward LOT

The two-dimensional forward LOT 50 (FIG. 2) on an 8×8 block is the composition of two identical one-dimensional LOTs, one applied successively to the eight rows of that block to generate an initial 8×4 transform block, followed by one applied to the columns of the 8×4 initial transform block. The one-dimensional LOT used is defined on an 8×8 block by the transform T represented in matrix form as $$T = \begin{bmatrix} -1 & 2 & 4 & 8 & 8 & 4 & 2 & -1 \\ -2 & 1 & 8 & 4 & -4 & -8 & -1 & 2 \\ 2 & 1 & -8 & 4 & 4 & -8 & 1 & 2 \\ 1 & 2 & -4 & 8 & -8 & 4 & -2 & -1 \end{bmatrix}$$

Figure 5:
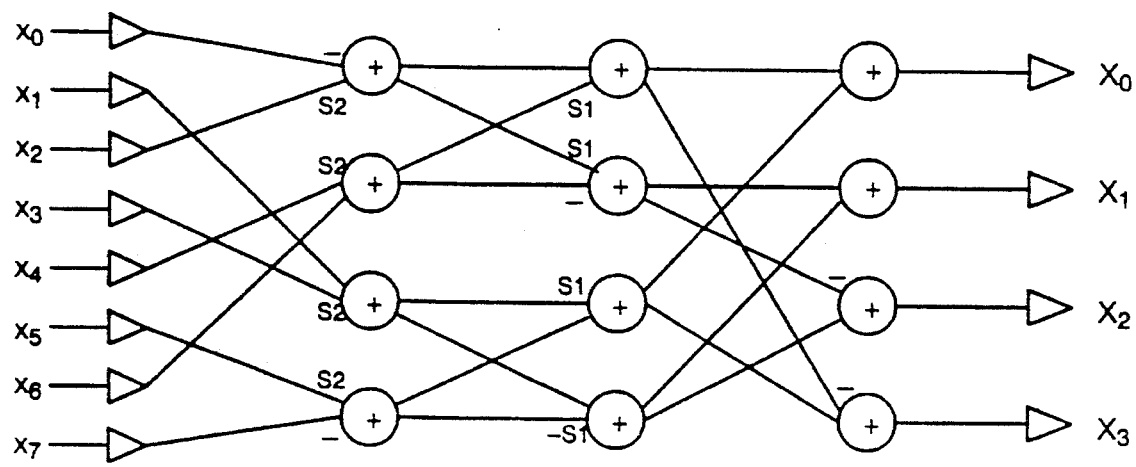
FIG. 5 is a diagram of computational elements for a fast forward LOT.

Referring to FIG. 5, in a fast implementation of this transform, the 8-dimensional vector $(x_0, x_1, \ldots, x_7)$ is transformed to the 4-dimensional vector $(X_0, \ldots, X_3)$ by the use of 12 additions (denoted by ⊕), 6 negations (denoted by "—"), and 8 bit-shifting operations (denoted by Sn, where Sn denotes a left shift by n bits).

The row-column iteration of the transform T defines the LOT, denoted here by L, on overlapping 8×8 blocks 110, 112 (FIG. 4) which, when centered on successive non-overlapping 4×4 blocks 118, 120 defines an orthogonal transform over the entire image. More precisely, the image is assumed to have row and column dimensions divisible by four. (If this is not the case, the image is augmented by repeating edge rows and/or columns to this effect.)

Figure 6:
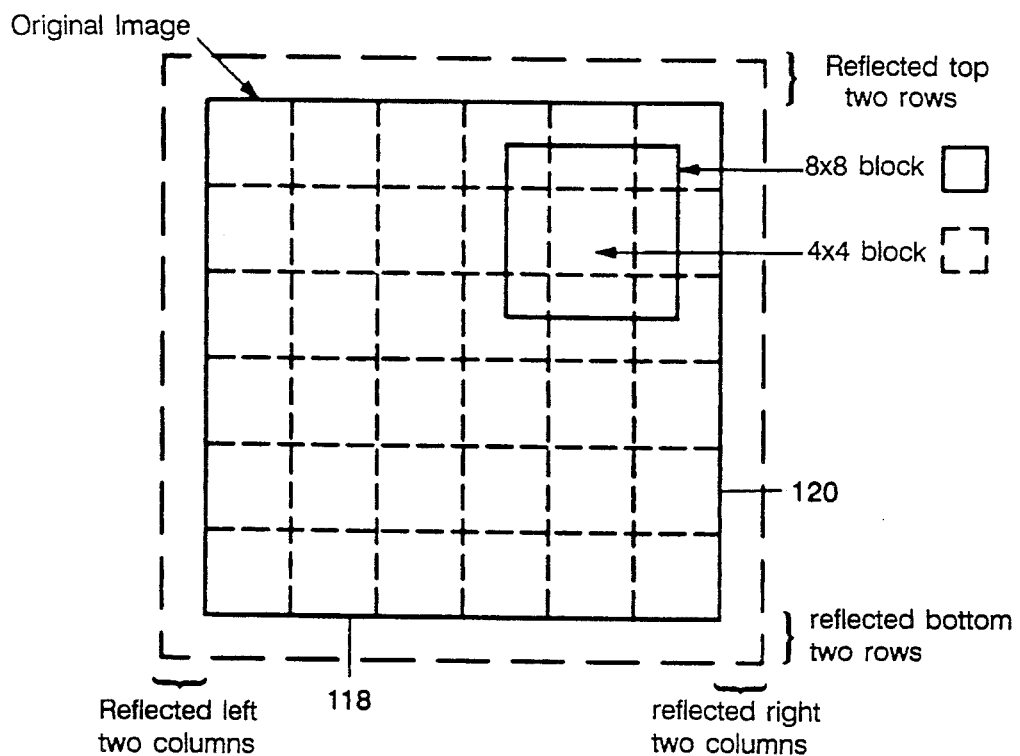
FIG. 6 is a diagram of an image partitioning for a forward LOT.

Referring to FIG. 6, the digital data for the original image 118 is partitioned into 4×4 blocks 120; the topmost two rows, bottommost two rows, leftmost two columns, and rightmost two columns are reflected about the top, bottom, left, and right of the image, respectively, as shown around the perimeter of the original image. The transform L is then applied to each of the 36 (in the example shown) different 8×8 blocks which is centered on one of the 4×4 blocks. Because each 8×8 block is transformed to a 4×4 block, this produces an array in the transform domain of the same dimension as the original image.

In addition to the computations saved by the structure shown in FIG. 5, additional computations are saved by reusing computations from previously transformed blocks. Since row transforms are performed first, a given 8×8 block reuses the last four row-LOT computations from the 8×8 block above it. This means that, except for the first row of blocks which must each perform eight row-LOT and four column-LOT computations, each block need only perform four row-LOT and four column-LOT computations.

The Inverse LOT

Figure 7:
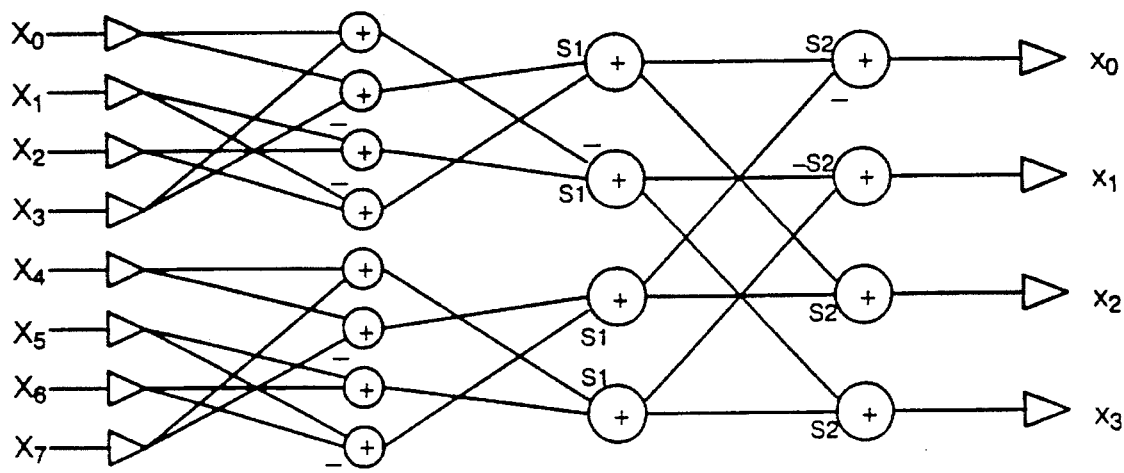
FIG. 7 is a diagram of computational elements for a fast inverse LOT.

The inverse LOT 85 (FIG. 2) is similar to the forward LOT in structure, with overlapping 8×8 blocks being mapped to 4×4 blocks. The inverse LOT uses the transform S defined by $$S = \begin{bmatrix} 8 & -4 & 4 & -8 & -1 & -2 & 2 & 1 \\ 4 & -8 & -8 & 4 & 2 & 1 & 1 & 2 \\ 2 & -1 & 1 & -2 & 4 & 8 & -8 & -4 \\ -1 & 2 & 2 & -1 & 8 & 4 & 4 & 8 \end{bmatrix}$$

to transform first the columns of an 8×8 block, and then the rows of the resulting 4×8 block. A fast implementation of this transform is illustrated in FIG. 7 which uses notation analogous to that of FIG. 5. This implementation uses 16 additions, 7 negations, and 8 shifts.

Figures 8, 9:
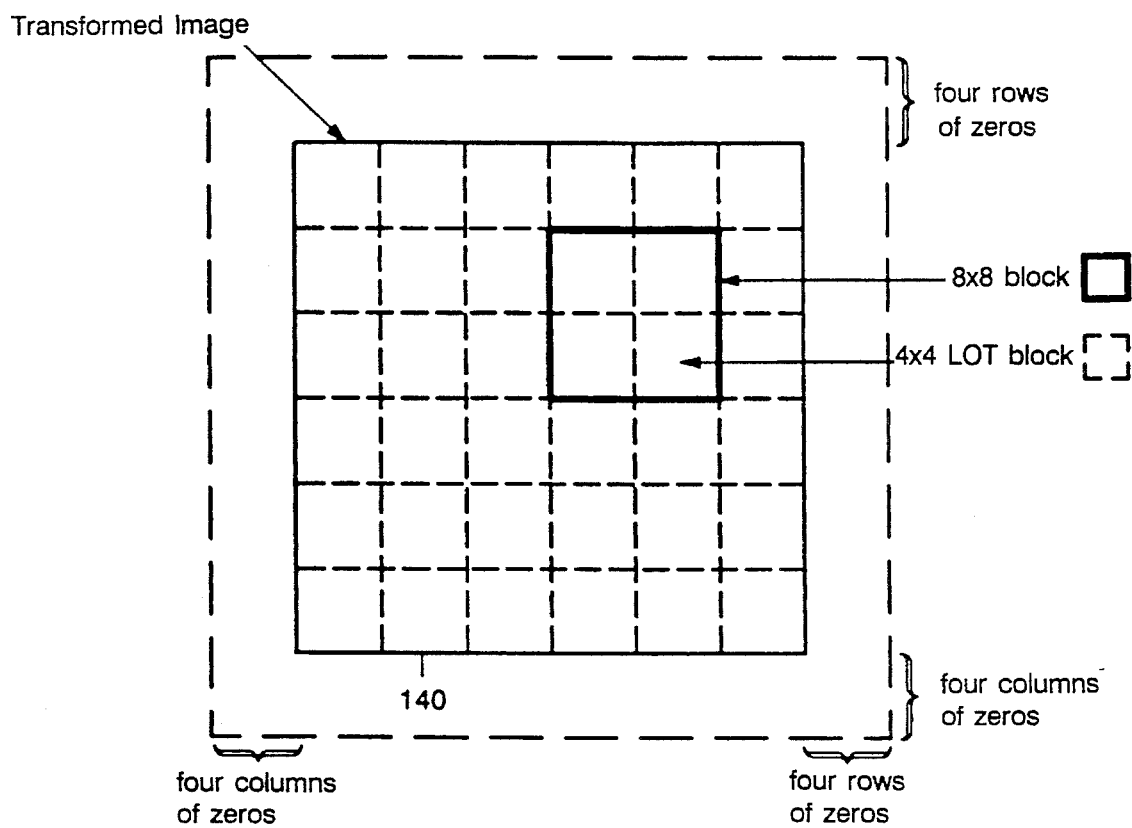
FIG. 8 is a diagram of an image partitioning for inverse LOT.
FIG. 9 is a diagram of LOT-block indices.

Referring to FIG. 8, the inverse LOT is defined over the entire image by first augmenting the forward transformed image 140 with an additional four rows of zeros at both the top and bottom, and an additional four rows of zeros at both the left and right sides. The augmented image is then partitioned into 4×4 blocks, and the column-row iterated transform S is successively applied to 8×8 blocks whose lower right-hand corners are defined by the partitioning. The resulting image is at this point larger by four rows and four columns than the original image. To complete the transform, the top two rows are reflected and added back into rows three and four (row one is added to row four and row two is added to row three); the bottom two rows are reflected and added back into the image in the same manner; the leftmost two columns are reflected and added back into columns three and four; and the rightmost two columns are likewise reflected and added back into the image. The resulting image is the same size as the original.

The inverse LOT, as defined above, is not a precise inverse since the composition of the above forward LOT and its inverse is the identity multiplied by a factor of 28900. This factor is the Euclidean length of a row of T or S raised to the fourth power (due to two applications each of T and S). The LOT and its inverse are defined as above in order to require only bit-shifting operations and additions for their computation. Both the task of renormalization of the forward-inverse LOT pair to a true identity, and the task of preserving of the ability to use 16-bit arithmetic throughout the forward and inverse LOT computations, are accomplished by a combination of bit-shifting operations during the LOT computations and usage of a rescaled VQ codebook (performed offline) for decoding, described below.

Normalization of Maintenance of 16-bit Arithmetic

For implementation on processors with a natural 16-bit architecture, the LOT and its inverse are approximated as follows. The forward LOT is computed on the rows of the image as described above, at which time each resulting transform coefficient is divided by eight and rounded, accomplished by adding four to each coefficient and right-shifting by three bits. The column-LOT is then applied to this output. This ensures that all transform coefficients of this redefined LOT are representable in 16 bits.

As explained below, upon encoding, each of the 4×4 transform blocks are replaced by VQ representative transform blocks from a pre-computed codebook. A standard implementation would inverse transform these representatives to produce the reconstructed image. In the present implementation, however, the decoder does not use representatives from the encoding VQ codebook, but rather those representatives with all elements divided by the constant factor 7.055664 and rounded to the nearest integer. The inverse LOT is implemented by performing the inverse column-LOT as above, and then dividing by eight and rounding (again, implemented by adding four and right-shifting by three bits). The inverse row-LOT is applied to these outputs, at which time the resulting coefficients are divided by 64 and rounded, implemented by adding 32 and right-shifting by six bits. The resulting inverse transformed image is then lower- and upper-limited to be in the range [0, 255] by checking for 1-bits in the left byte of the 16-bit word.

These shifting operations result in a net division by $8(8)(64)=4096$ when the LOT and its inverse are successively applied. The renormalization of the codebook (performed offline) results in a further division by 7.055664, for a total division by 28900, which results in a properly normalized transform pair.

The division and rounding ensures that 16 bits is sufficient to avoid overflow in any of the computations, but does cause the forward-inverse LOT pair to be a non-exact inverse. However, this pair when applied to test images (with no quantization) produces images differing from the original only at a very small percentage of pixels, and then only by one gray level (out of 256) which has no discernible visual effect on reconstruction.

Vector Quantization (VQ)

In typical transform-quantization coding schemes, all of the individual coefficients of a transform block are separately (scalar) quantized. In optimal vector quantization (VQ), the transform coefficients, grouped together and treated as elements in a single appropriate multidimensional space, are quantized together. Theory dictates that for a given number of quantization levels for the entire block of coefficients, the quantization error is lower for optimal VQ than for optimal scalar quantization.

The present invention utilizes a hybrid between scalar quantization and vector quantization. The 4×4 transform blocks output from the forward LOT are separated into (e.g., two) groups, and the groups are separately and independently subjected to VQ. The grouping of the coefficient blocks allows much of the theoretical gain from a full optimal (one group) VQ to be realized, while decreasing both the number of codebook elements to be stored and the number of codebook elements which need to be searched to do the quantization. There are three steps to implementing the hybrid VQ: design of vector grouping (off-line); construction of the VQ codebooks (off-line); and determination of the nearest codebook element for each data vector (on-line). We consider each step in turn.

Coefficient Grouping

VQ achieves its coding gains through exploitation of coefficient dependencies and through the so-called dimensionality increase. A design which groups more highly cross-correlated coefficients together and has the smallest number of groups then provides, in theory, the best compression for a given number of quantization levels.

Referring again to FIG. 2, to determine the groupings to be used within a 4×4 LOT coefficient block, the following procedure is used, off-line prior to actual compression and reconstruction operations. First, a large number of training images 160 are transformed with the LOT, and the resulting 4×4 LOT blocks are treated as an even larger collection of statistically independent 16-element vectors following a common distribution. Under these assumptions, ensemble cross-correlations and associated confidence bounds between the 16 elements are computed 162 using standard statistical methods. For the LOT as defined above, the correlation process naturally groups (164) elements 0, 2, 8, and 10 together as a first group; and the remaining elements 1, 3, 4, 5, 6 ,7, 9, 11, 12, 13, 14, and 15 together as a second group, where the element indices are as illustrated in FIG. 9. The first group is termed the gray scale vector and the second group the structure vector.

Using a broad range of training images, the elements of the gray scale vector show statistically insignificant cross-correlation with those of the structure vector, while significant cross-correlation exists between elements within each vector separately. An additional reason for including elements 0, 2, 8, and 10 together in a single group is that, since they are each the result of applying successively the non-zero mean first or third row of the transform T in the forward LOT computation, it is these coefficients which have non-zero mean and which therefore isolate the mean value of the pixel block transformed. Since most of the energy in the pixel block is mean value (or "DC") energy, these elements of the LOT coefficient block have the highest mean-square value.

For both codebook generation, then, and codebook element selection, the gray scale and structure groups are treated separately.

VQ Codebook Construction

VQ codebook construction is computationally intensive and is accomplished off-line. Codebooks of gray scale and structure vectors which approximate input gray scale and structure vectors are constructed 170 using selected training images 168 (which were previously LOT transformed and coefficient grouped 166). The sizes of the codebooks largely determine the compression ratio, the speed of compression, and the quality of the reconstructed images, with smaller codebooks yielding higher compression ratio and speed, but poorer reconstruction quality. Codebooks may be of any size, but, in this embodiment, sizes of 16, 32, 64, and 128 vector elements are selected for both the gray scale and structure VQ codebooks. Any pair of gray scale and structure codebooks may be combined to perform VQ on a transformed image.

The construction 170 of a VQ codebook is accomplished through a codebook initialization process followed by an iterative optimization process. The iterative optimization finds a VQ codebook achieving an approximate local minimum of a selected error metric. This being the case, the initialization process largely determines the quality of the codebook. In this embodiment, a pairwise nearest neighbor (PNN) initialization procedure is used, as described in Equitz, A New Vector Quantization Clustering Algorithm, IEEE Transactions on Acoustics, Speech, and Signal Processing, vol. 37, no. 10, October 1989, pp. 1568–1575, incorporated by reference. The optimization procedure is the classical Linde-Buzo-Gray (LBG) algorithm, described in Linde, Buzo, and Gray, An Algorithm for Vector Quantizer Design, IEEE Transactions on Communications, vol. COM-28, no. 1, January 1980, pp. 84–95, incorporated by reference. The error metric for both initialization and iteration is the mean-square (Euclidean) distance.

The VQ codebook generation procedure starts with selected training images 168. Since the PNN and LBG algorithms must hold all input vectors (i.e., vectors for all training images) in memory (or at least virtual memory) at once, only a subset may be processed during a given codebook generation run. (A method for subsequent processing of the rest of the training images is described below.) The image subset is transformed with the LOT, and each 16-element LOT block is partitioned into gray scale and structure vectors as above. The totality of the gray scale vectors and the totality of the structure vectors are separately subjected to the PNN/LBG VQ codebook generation procedure 170. The output is the prescribed number of vector codebook elements 172, also called centroids.

A part of the present invention is a method to utilize computations inherent in the PNN and LBG procedures to allow an essentially unlimited amount of training data to be used in the generation of a VQ codebook. For each centroid, a count of the number of input data vectors which quantize to that centroid is maintained during the LBG iterations. These counts are output with the centroids. More training data is effectively included in the codebook by defining a new input data set to be the previously computed centroids, each with associated weight equal to the number of data vectors in the previous codebook generation which quantize to that centroid, plus the new training data vectors, each with unit weight. This augmented training data set is input to the PNN/LBG algorithm pair. The. PNN algorithm naturally uses these weights in its clustering procedure. The LBG algorithm in turn keeps, as before, a count of the number of training vectors quantizing to each centroid; however, those training vectors which were actually centroids from the previous PNN/LBG run add weight equal to their input weight. This process may be repeated ad infinitum to add more training data to the codebook. Since the actual mean-square error associated with a centroid is not maintained in this procedure, in practical implementations, more centroids than the desired final of centroids should be maintained until the last iteration. The present implementation keeps 2048 centroids, for both gray scale and structure codebooks, until the last iteration, at which time the 2048 centroids are collapsed to 16, 32, 64, or 128 elements, yielding the final codebooks.

VQ Codebook Searching

Although the VQ codebooks are constructed off-line, the encoding process must still perform an on-line selection of gray scale and structure VQ codebook representatives for each LOT coefficient block of the input image. For encoding speed, it is important that this process be fast. A method for selecting VQ vectors quickly, and which selects the best VQ representatives for the overwhelming majority of input vectors, utilizes the LOT coefficients with the highest energy.

Gray scale VQ codebook search

For the gray scale vector, coefficient 0 (FIG. 9) contains the most energy. Consequently, the gray scale VQ codebook is ordered according to coefficient 0. Then an integer-valued vector is computed, specific to that codebook, which approximately indexes the $0^{th}$ elements of that codebook. This vector, called a start map and used to start the VQ searching procedure, can be of any length. Longer lengths, however, give more accurate starting positions. More specifically, the $i^{th}$ element of the start map is the index (under the ordering above) of the gray scale VQ vector whose $0^{th}$ element is nearest to the quantity iN+b, where N is a normalization factor, and b is a bias. The quantities N and b are selected so that the extreme values of iN+b bracket the extreme values of LOT coefficient 0. The values used in the current implementation are b =−4000 and N=2, with a total start map vector length of 16384. The gray scale VQ codebook vector search is then started at the codebook index given by the start map at index (x−b)/N, where x is the input $0^{th}$ element of the gray scale LOT coefficient vector to be quantized.

Both the codebook ordering and the construction of the start map are accomplished off-line. The on-line VQ computations begin with the selection of the codebook search start index, computed from the start map. To speed the search, only coefficients 0, 2, and 8 are used in the comparisons, since coefficient 10 is near zero and highly correlated with the other coefficients. A gray scale VQ codebook element is compared with a gray scale vector to be quantized by computing their mean-square difference. Because of orthogonality, this comparison metric is also the mean-square difference between their inverse transforms in the spatial domain. The mean-square difference is computed by successively adding the square of the difference between corresponding indices 0, 2, and 8, in that order. The quantization step proceeds by computing comparison metrics, or partial comparison metrics, for successive codebook elements in an alternating manner. That is, if n is the starting codebook index, comparisons are made with indices n+1, n−1, n+2, n−2, n+3, n−3, and so forth, until the best codebook vector is found. During the VQ search procedure for each gray scale vector to be encoded, the minimum comparison metric is maintained. If, during computation of the mean-square difference, that minimum is exceeded, the comparison with the present vector is terminated. If the squared difference between $0^{th}$ elements exceeds that minimum, those VQ vectors with indices below (respectively, above) that vector, if that vector has index less than (respectively, greater than) the index of the starting vector, are eliminated, since those vectors are guaranteed to have greater comparison metric values because of the codebook ordering. The search is also terminated if all codebook vectors have been examined. The VQ codebook vector corresponding to the minimum comparison metric is selected as the quantizing vector. This procedure guarantees that, except for differences which might have been introduced by coefficient 10, the VQ codebook element whose mean-square difference from the vector to be quantized is minimal has been selected in the quantization step. Of course, coefficient 10 could be used in the search procedure computations to ensure optimality.

Structure VQ codebook search

The search for the optimal structure VQ codebook representative proceeds in a manner completely analogous to that for the gray scale representative. Since coefficients 1, 3, 4, 5, and 12 (FIG.) contain most of the energy in the structure vector, these elements are used in structure quantization. Coefficients 1 and 4 contain approximately the same amount of energy, each containing more than coefficients 3, 5, and 12. Coefficient 5 contains more energy than 3 and 12, which each contain approximately the same amount. Consequently, the structure VQ codebook is ordered according to coefficient 1, a start map is constructed as for the gray scale VQ codebook, and mean-square difference comparison metrics are computed using the coefficients in the order 1, 4, 5, 3, 12. The start map for the structure VQ codebook is also of length 16384, and uses normalization N=1 and bias b=−8192. Structure VQ codebook elements are compared in an alternating manner as above, a running minimum comparison metric is maintained, and analogous stopping rules are used for the search. As for the gray scale search, this algorithm guarantees that except for differences which might have been introduced by coefficients 6, 7, 9, 11, 13, 14, and 15, the best mean-square representative from the structure VQ codebook has been selected in the quantization step. Again these coefficients could be used also to ensure optimality at the expense of some extra computation.

VQ Decoding

The VQ decoding step is a simple lookup and recombination procedure. On decoding, the gray scale and structure VQ codebook elements corresponding to the indices chosen during the encoding process are fetched from the decoding VQ codebook and recombined, in the appropriate order, to reconstruct the encoded LOT coefficient block. In this implementation, the decoding VQ codebook is the encoding codebook with all elements integer-divided by 7.055664 as explained above. All of the reconstructed LOT coefficient blocks form a matrix of the original image dimensions which are then inverse transformed by the inverse LOT to produce the reconstructed image.

Arithmetic Coding (AC)

The output of the VQ step 63, 64 (FIG. 2) is two sequences of VQ codebook indices, one corresponding to the gray scale vectors, and one corresponding to the structure vectors. Some statistical redundancy exists in these indices, arising from interblock predictability, which can be eliminated through the use of an entropy coder. In this implementation, arithmetic coding (AC) schemes 67, 69 are used on each of the index sequences. Arithmetic coding is a variable-length, lossless coding technique which produces a code stream through successive rescaling of code intervals according to a stochastic model of the source. The effectiveness of the compression is a direct consequence of the fidelity of the assumed stochastic model. A basic (non-conditional) arithmetic coding procedure is set forth in Witten, Neal, and Cleary, Arithmetic Coding for Data Compression, Communications of the ACM, vol. 30., no. 6, June 1987, pp. 520–540. The basic procedure is either adaptive, so that a probability distribution describing the source may adapt to changing source statistics; or static, so that a fixed distribution is used throughout the coding process. In addition, the AC process can also use conditional, or contextual information. That is, rather than using one distribution (as in the Witten reference), multiple conditional probability distributions are used to code source symbols (VQ indices, in this case) based on predefined contexts. One implementation uses separate static AC codebooks and separately defined contexts to code the two VQ index sequences. The procedures involve an off-line AC codebook generation and normalization procedure, and on-line encoding and decoding procedures.

Gray Scale Index Coding

The gray scale index AC procedure uses the same number of contexts as symbols. Therefore, use of an n-element gray scale VQ codebook entails the use of an n-context gray scale index AC coder. The contexts can be equated with linear predictions of LOT coefficient 0 (FIG. 9). To precisely define the contexts, denote by $z_{left}$, $z_{above}$, and $z_{corner}$ the $0^{th}$ coefficients of the LOT blocks whose positions relative to the LOT block corresponding to the gray scale index to be encoded are, respectively, immediately to the left, immediately above, and above and to the left. The prediction of the $0^{th}$ coefficient of the gray scale VQ index to be encoded is defined to be $$x=(3z_{left}+3z_{above}-2z_{corner}+2)/4$$

where the division is an integer division with remainder disregarded. The context is then defined to be the index of x given by the gray scale VQ start map, whose definition and implementation are described above. The context is then represented by an integer between 0 and n−1, where n is the number of elements in the gray scale VQ codebook. The equation for x is a linear prediction based on a conglomeration of autoregressive models fit to test data and approximated so that it is implementable using only bit-shifts and additions.

For LOT blocks which are on either the top or left edge of the image, the context definition above does not apply. For blocks on the left edge, context is defined to be the gray scale VQ index of the block immediately above. For blocks on the top edge, context is defined to be the index of the block to the left. For the upper left block, context is the center gray scale VQ index.

The construction of AC codebooks 180 is the construction of conditional probability distributions of the symbols for each context. An AC codebook for each gray scale VQ codebook is constructed off-line by accumulating statistics on context-index pairs for selected training images 182. Specifically, training images, distinct from the images 160, 168 used to generate the VQ codebooks, are run through a procedure 184 which computes the LOT, quantizes each block based on the VQ vector selection algorithm described above, then computes the context of each gray scale index and accumulates the counts of each context-index pair. For each fixed context, the sample distribution of the indices so obtained defines the conditional distribution of the gray scale indices.

In the implementation of the arithmetic coder, these distributions are modified so as to be represented as integers, in cumulative form, with no zero-probability indices, and normalized. This is accomplished on a context-by-context basis as follows. To eliminate zero probability indices, the number of counts for each index with count zero is set to one. Then, the total number of counts, T, is found. The number of counts for each index is then integer-multiplied by 16384/T so that the effective total number of counts is approximately 16384 ($=2^{14}$). The largest counts are then increased or decreased so that the number of counts is exactly 16384. The reason for this normalization is that in the AC implementation (see the Witten reference), the encoder performs two integer divisions by the total number of counts for each symbol encoded. These divisions are thus replaced by 14-bit shifts, improving the speed of execution.

Once this set of conditional cumulative distributions is defined, the context-based AC procedure is a modification of the basic non-adaptive procedure described in the Witten reference. Gray scale indices are coded in raster order, using the following steps: (1) Get gray scale VQ index to be encoded; (2) Find context of index to be encoded; (3) From AC codebook, select cumulative probability distribution based on that index; (4) Encode index (as in the Witten reference) based on selected distribution. The implementation of the Witten reference is modified by eliminating function calls, making use of register declarations, and using shifts in place of divisions where possible in order to improve speed.

Structure Index Coding

Structure indices are coded in a manner completely analogous to the coding method for the gray scale indices. The structure index AC procedure uses the same number of contexts as symbols, so that use of an n-element structure VQ codebook entails the use of an n-context structure index AC coder. The context definition is simpler, however, than in the gray scale index case. The context of a structure index to be coded is simply the structure VQ index of the LOT block to the left of the block to be encoded. In case the LOT block is on the left edge of the image, the context is defined to be the structure VQ index of the LOT block immediately above the block to be encoded. Finally, the upper left LOT block has context equal to the center structure VQ index.

Structure AC codebooks are constructed off-line in exactly the same way (and are constructed at the same time) as the gray scale AC codebooks. That is, training images are transformed under the LOT and quantized with VQ, contexts are found, and context-index pairs are accumulated. For each context, the sample distributions obtained from this procedure are normalized and represented in exactly the same way as the gray scale distributions.

Once this set of conditional cumulative distributions is defined, the context-based AC of the structure VQ indices proceeds just as for the gray scale indices. That is, structure indices are coded in raster order, using the following steps: (1) Get structure VQ index to be encoded; (2) Find context of index to be encoded; (3) From AC codebook, select cumulative probability distribution based on that index; (4) Encode index (as in Witten reference) based on selected distribution. The concatenation of the gray scale and structure index AC code streams defines the encoded file 20, 25 using this algorithm.

AC Decoding

The first step in decoding a file encoded by this algorithm is the AC decoding of the VQ indices. The AC decoders, for both structure and gray scale indices, mirrors the operation of the AC encoders. Specifically, indices are decoded in raster order using the following steps: (1) Determine context of index to be decoded (determined from previously decoded symbols); (2) From AC codebook, select cumulative probability distribution based on that index; (3) Decode index (as in Witten reference) based on selected distribution; (4) Record decoded index. The decoded VQ indices are then subjected to VQ decoding and the inverse LOT to produce the reconstructed image.

Color Compression

The compression of a color image with this algorithm utilizes the representation of the image in luminance-chrominance, or YUV, color space. However, computer monitor technology makes the RGB (red, green, blue) color coordinate system representation a standard one, with each pixel represented by 24 bits, comprised of 8 bits for each of the three channels. For compression of RGB color images, the present implementation uses a non-standard definition of YUV color space and accompanying transform from RGB to YUV space and back given by $$\begin{bmatrix} Y \\ U \\ V \end{bmatrix} = \begin{bmatrix} 1/6 & 2/3 & 1/6 \\ 1/4 & -1/2 & 1/4 \\ 1/2 & 0 & -1/2 \end{bmatrix} \cdot \begin{bmatrix} R \\ G \\ B \end{bmatrix} + \begin{bmatrix} 0 \\ 128 \\ 128 \end{bmatrix}$$

and $$\begin{bmatrix} R \\ G \\ B \end{bmatrix} = \begin{bmatrix} 1 & 4/3 & 1 \\ 1 & -2/3 & 0 \\ 1 & 4/3 & -1 \end{bmatrix} \cdot \begin{bmatrix} Y \\ U-128 \\ V-128 \end{bmatrix}$$

These transformation equations are implemented entirely with bit-shifts and additions, with the exception that one division is required in both transformations. The transformations are accomplished in 16-bit arithmetic, with each component in each color space represented as a non-negative 8-bit integer. In the transformation from RGB to YUV, the YUV component computations are implemented as $Y=(R+4G+B+3)/6$ $U=(R-2G+B+2)/4+128$ $V=(R-B+1)/2+128$ where the multiplications and divisions by 2 and 4 are bit shifting operations, and the division by 6 is an integer division. In the color compression algorithm, the U and V components are subsampled by a factor of two in each direction. Consequently, the U and V computations are made only for every other pixel in each direction. The Y, U, and V components are treated as separate (gray scale) images and subjected to the compression algorithm to produce three code streams which are combined to produce the final output code file.

On decoding, the Y, U, and V component images are reconstructed and recombined via the YUV-to-RGB transformation. In this transformation, the RGB component computations are implemented as $U'=[4(U-128)+1]/3$ $V'=V-128$ $R=Y+U'+V'$ $G=Y-U'/2$ $B=Y+U'-V'$ with the R, G, and B values upper- and lower-limited to [0, 255]. The multiplication by 4 and the division by two are implemented as bit-shifts, while the division by 3 is an integer division. Because of the subsampling of U and V in the transform to RGB color space, the computation of U' and V' is carried out only for every other pixel in each direction.

Other embodiments are within the following claims.

We claim:

1. Apparatus for generating a compressed data file from an original data file used to represent a continuous-tone image, comprising a transformer for transforming by a lapped orthogonal transform the original data file to generate a transform file of coefficients, a quantizer for quantizing the transform coefficients to generate quantized values, and a coder for coding the quantized values to generate the compressed data file, the transformer being arranged to compute all transform coefficients by means only of bit shifts, negations, and adds.

2. The apparatus of claim 1 wherein said lapped orthogonal transform uses only multiplier values which are powers of 2.

3. The apparatus of claim 2 wherein said lapped orthogonal transform uses multiplier values of ±1, ±2, ±4, and ±8.

4. The apparatus of claim 3 wherein said lapped orthogonal transform is based on successive transformations of blocks of data and includes inter-block and intra-block computations, and wherein transformations of blocks reuse inter-block and intra-block computations.

5. The apparatus of claim 1 further comprising factoring the coefficients into at least two groups, and applying the quantizing and coding independently to the respective groups.

6. The apparatus of claim 1 wherein said coding comprises entropy coding.

7. The apparatus of claim 6 wherein said entropy coding comprises arithmetic coding.

8. The apparatus of claim 7 wherein said arithmetic coding is conditioned on contexts.

9. Apparatus for generating a compressed data file from an original data file used to represent a continuous-tone image, comprising a transformer for transforming the original data file to a transform file of coefficients, means for factoring the coefficients into at least two groups, and a quantizer/coder for vector quantizing each of said groups of transform coefficients separately after factoring, and for coding the groups of transform coefficients separately and wherein said transform comprises a lapped orthogonal transform which computes all transform coefficients by means only of bit shifts, negations, and adds.

10. Apparatus for generating a compressed data file from an original data file used to represent a continuous-tone image, comprising a transformer for transforming the original data file to a transform file of coefficients, means for factoring the coefficients into at least two groups, and a quantizer/coder for vector quantizing each of said groups of transform coefficients separately after factoring, and for coding the groups of transform coefficients separately and wherein said transform comprises a lapped orthogonal transform which uses only multiplier values which are powers of 2.

11. The apparatus of claim 10 wherein said lapped orthogonal transform uses multiplier values of ±1, ±2, ±4, and ±8.

12. Apparatus for generating a compressed data file from an original data file used to represent a continuous-tone image, comprising a transformer for transforming the original data file to a transform file of coefficients, means for factoring the coefficients into at least two groups, and a quantizer/coder for vector quantizing each of said groups of transform coefficients separately after factoring, and for coding the groups of transform coefficients separately and wherein said transform comprises a lapped orthogonal transform which is based on successive transformations of blocks of data, and wherein transformations of blocks reuse inter-block and/or intra-block computations.

13. Apparatus for generating a compressed data file from an original data file used to represent a continuous-tone image, comprising a transformer for transforming, by a lapped orthogonal transform which uses only multiplier values of ±1, ±2, ±4, and ±8, the original data file to generate a transform file of coefficients, means for factoring the coefficients into at least two groups, a quantizer for quantizing independently the respective groups of transform coefficients to generate corresponding groups of quantized values, and a coder for arithmetic coding independently the groups of quantized values, based on contexts, to generate the compressed data file, the lapped orthogonal transform being arranged to compute all transform coefficients by means only of bit shifts, negations, and adds, the lapped orthogonal transform being based on successive transformations of blocks of data and wherein transformations of blocks reuse inter-block and/or intra-block computations.

14. Apparatus for processing a continuous-tone image for later reconstruction, comprising means for acquiring from the image an original data file of digital data values representing continuous-tone information in the image, a transformer for transforming by a lapped orthogonal transform the original data file to generate a transform file of coefficients, a quantizer for quantizing the transform coefficients to generate quantized values, and a coder for coding the quantized values to generate the compressed data file, the lapped orthogonal transform being arranged to compute all transform coefficients by means only of bit shifts, negations, and adds.

15. Apparatus for reconstructing an original data file used to represent a continuous-tone image from a compressed data file of the kind generated by a device having a transformer for transforming by a lapped orthogonal transform the original data file to generate a transform file of coefficients, a quantizer for quantizing the transform coefficients to generate quantized values, and a coder for coding the quantized values to generate the compressed data file, the transformer being arranged to compute all transform coefficients by means only of bit shifts, negations, and adds, the apparatus comprising a decoder for decoding the compressed data file to generate the quantized values, means for deriving the transform coefficients from the quantized values, a transformer for inverse transforming by an inverse lapped orthogonal transform the compressed data file to generate the transform file of coefficients, the transformer being arranged to compute all transform coefficients by means only of bit shifts, negations, and adds.

16. Apparatus for generating a compressed data file from an original data file used to represent a continuous-tone image, comprising a lapped orthogonal transform device for transforming the original file of data to generate a transform file of coefficients, a quantizer for quantizing the transform coefficients, and a coder for encoding the quantized values to generate the compressed data file, the lapped orthogonal transform device consisting of bit shifting, negation, and addition computational elements.

17. Apparatus for processing a continuous-tone image for later reconstruction, comprising a camera or scanner for acquiring from the image an original data file of digital data values representing continuous-tone information in the image, a transform device for transforming by a lapped orthogonal transform the original file of data to generate a transform file of coefficients, a quantizer for quantizing the transform coefficients, and an encoder for coding the quantized values to generate the compressed data file, the transform device consisting of bit shifting, negation, and addition computational elements.

18. Apparatus for converting an RGB pixel data file used to represent a color image expressed in RGB color space points, wherein each RGB point includes R, G, and B components, to a YUV pixel data file used to represent said color image in YUV color space points, wherein each YUV point includes Y, U, and V signal components, for subsequent processing in YUV format comprising means for representing each R, G, and B component as a non-negative 8-bit integer, and a converter for converting said R, G, and B components to Y, U, and V components using only bit shifts and additions and no more than a single division operation.

19. The apparatus of claim 18 wherein said converting of said R, G, and B components to said Y, U, and V components is done in accordance with the following relationships between said R, G, and B components and said Y, U, and V components:

$Y=(R+4G+B+3)/6$ $U=(R-2G+B+2)/4+128$ $V=(R-B+1)/2+128$

20. The apparatus of claim 18 further comprising reconverting the YUV pixel data file to an RGB pixel data file corresponding to said color image expressed in RGB color space points by performing only multiplications, additions, shifts and no more than a single division.

21. The apparatus of claim 20 wherein said reconversion is done in accordance with the following relationships between said R, G, and B components and said Y, U, and V components:

$U'=[4(U-128)+1]/3$ $V'=V-128$ $R=Y+U'+V'$ $G=Y-U'/2$ $B=Y+U'-V'$

22. Apparatus for generating a set of centroids to serve as a codebook for use in vector quantization of data corresponding to a continuous-tone image comprising means for applying PNN and LBG procedures to create centroids, a counter for counting the number of vectors which quantize to each centroid, an updater for updating the centroids by reapplying the PNN and LBG procedures to input data which includes the previously generated centroids each applied with a weight based on the number of vectors which quantized to that centroid.

23. The apparatus of claim 22 wherein said updating step results in a reduced number of centroids.

24. A method of processing a continuous-tone image comprising using a camera or scanner to derive digital data signals representing the image, temporarily storing the digital data signals in a tangible storage medium as an original data file, retrieving the original data file from the storage medium, transforming, by a lapped orthogonal transform using only bit shifts, negations, and adds, the original data file to generate a transform file of coefficients, quantizing the transform coefficients to generate quantized data values, coding the quantized values to generate a compressed data file, storing the compressed data file on a tangible storage medium using digital signals or transmitting the compressed data file on a tangible communication medium using digital signals, receiving or retrieving the compressed data file, decoding the compressed data file to generate quantized values, deriving transform coefficients from the quantized values, inverse transforming by an inverse lapped orthogonal transform using only bit shifts, negations, and adds, the compressed data file to generate a transform file of coefficients, reconstructing the original data file from the transform file of coefficients, and using a printing or display device to regenerate the continuous-tone image.

* * * * *

UNITED STATES PATENT AND TRADEMARK OFFICE
CERTIFICATE OF CORRECTION

PATENT NO.  : 5,455,874

DATED       : October 3, 1995

INVENTOR(S) : Charles C. Ormsby et al.

It is certified that error appears in the above-identified patent and that said Letters Patent is hereby corrected as shown below:

In Col. 3, line 38, after "to" insert --produce--.

In Col. 9, line 4, after "The" delete the period.

In Col. 9, line 14, after "final" insert --number--.

In Col. 10, line 33, delete "FIG".

Signed and Sealed this

First Day of October, 1996

Attest:

BRUCE LEHMAN

Attesting Officer

Commissioner of Patents and Trademarks